UNITED STATES PATENT OFFICE.

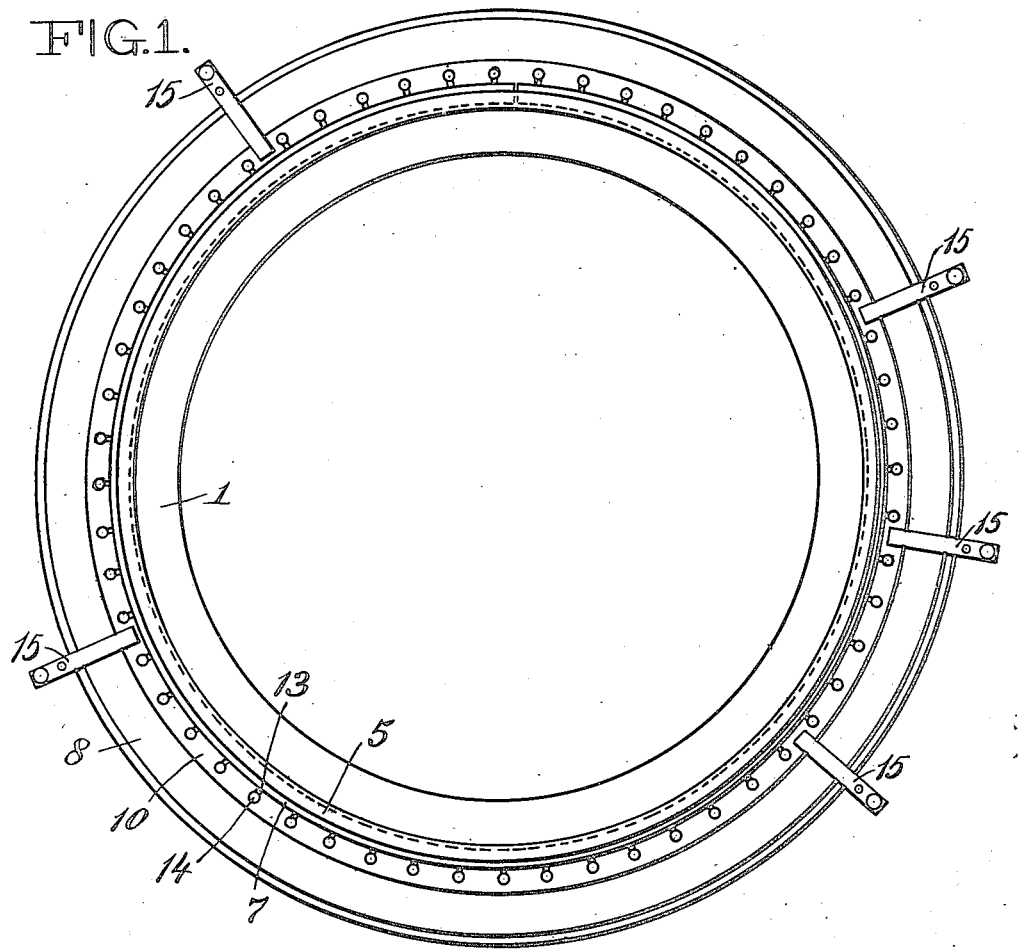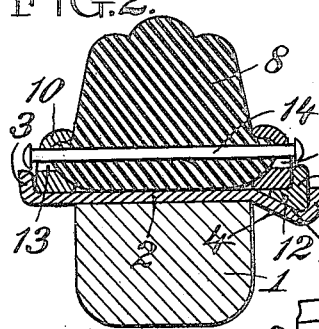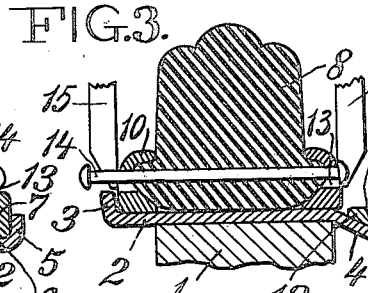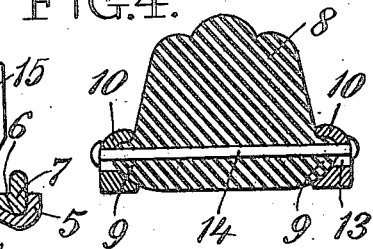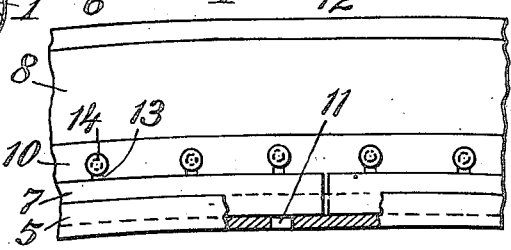

JOHN R. GAMMETER, OF AKRON, OHIO, ASSIGNOR, BY MESNE ASSIGNMENTS, TO THE B. F. GOODRICH COMPANY, A CORPORATION OF NEW YORK.

VEHICLE-TIRE.

1,140,370.  Specification of Letters Patent.  Patented May 25, 1915.

Application filed November 3, 1910. Serial No. 590,414.

*To all whom it may concern:*

Be it known that I, JOHN R. GAMMETER, a citizen of the United States, residing in the city of Akron, county of Summit, and State of Ohio, have invented certain new and useful Improvements in Vehicle-Tires, of which the following is a specification.

My invention relates to improvements in vehicle tires and particularly to solid or cushion tires of rubber or other resilient material.

Solid, or substantially solid rubber vehicle tires have, as is well-known, been extensively used on vehicles of many classes, being in many cases found more desirable for use than pneumatic tires. Difficulty has, however, been experienced in properly securing these tires to vehicle wheels, it usually being attempted to permanently secure the tire to the wheel, with the result that when the tire became worn out, or it was desired to remove the same for any other reason, a more or less complicated operation had to be performed. Many of the methods used to secure tires of this class to vehicle wheels involved the use of special machinery and were capable of being performed only in a machine shop equipped for the purpose. By my invention I am enabled to quickly and easily apply a solid rubber tire to a wheel, or to equip a wheel interchangeably with either a solid or a pneumatic tire.

In the accompanying drawings, in which I have illustrated a preferred embodiment of my invention, Figure 1 is a side elevation of a wheel felly equipped with a rim and tire according to my invention; Fig. 2 is a transverse section through a wheel felly, rim and tire, the latter being shown in normal working condition; Fig. 3 is a view similar to Fig. 2, showing the tire compressed in order to permit the application or removal of the locking ring; Fig. 4 is a transverse sectional view through the tire separated from the wheel, and Fig. 5 is a side elevation of a portion of a tire and rim, a part of the wall of the rim channel being broken away.

Referring to the drawings in detail, the numeral 1 designates a wheel felly upon which is permanently secured by shrinking, or in any other suitable manner, a rim 2 having at one side an outwardly projecting flange 3, and at the other side a downwardly bent portion 4 provided with an outwardly projecting flange 5, thus forming a channel 6 adapted to receive a locking ring 7. The tread portion of the tire comprises an endless ring 8 of rubber, or other resilient material. This tire may be of any desired configuration, and is preferably but not necessarily provided with laterally projecting beads 9 adapted to fit the clenches of endless rings 10 if rings of the standard configuration designed to receive pneumatic clencher tires are used. The rings 10, whether clencher or not, are permanently secured to the resilient part of the tire by means of a plurality of rods passing through slots in the rings and through holes in the resilient part 8 of the tire. The rods are preferably retained in position by having their heads riveted over as indicated. The tire is adapted to be secured in position upon the rim by means of the locking ring 7 which in the form of my invention illustrated is split transversely, one end of it being provided with a downwardly projecting pin 11 adapted to pass through a hole formed in the bottom of the channel portion of the rim. The tire is secured to the rim by applying the same thereto and compressing it, as indicated in Fig. 3, clamps 15 or other suitable means being used for effecting this compression, if found necessary. The locking ring 7 is then placed in the channel 6 and the tire permitted to expand to its normal position, as indicated in Fig. 2, when one of the rings 10 will slide over and rest upon the laterally projecting flange 12 of the locking ring 7, thus preventing the locking ring from coming out of its seat. The width of the rim is preferably such that the rings 10 are held slightly closer together when the tire has been applied to the rim than they are before the tire is applied, the resilient part of the tire being thus slightly compressed and consequently exerting a constant outward pressure upon the rings, tending to insure their being held in position. If it is desired to remove the tire at any time, it is simply necessary to again laterally compress the same to the condition shown in Fig. 3, when the locking ring is free to be removed, thereby permitting the tire to be taken off. The slots 13 in the rings 10 through which the ends of the rods 14 pass are preferably not of a size to fit the rods closely, but are, as shown, elongated in a radial direction. The object of this construction is to permit the resilient part of the tire to seat directly upon the rim and transmit the load directly thereto. If the rods 14 fitted tightly within the holes in the rings, a portion of the load might be transmitted through the resilient part of the tire to the rods and thence to the rings. Under such circumstances there would be a tendency for the rods to cut the rubber, which would seriously impair the durability of that part of the tire. With the construction shown, however, the rubber, in being compressed against the rim, simply carries the rods with it, the ends of the rods sliding in the slots 13. There is thus no transmission of force from the rubber to the rods and no tendency for relative movement between them. The rods, however, serve to retain the rings 10 in proper position with relation to the rubber part of the tire and prevent relative creeping movement. The rubber ring 8 and metallic rings 10 thus form a unitary tire structure capable of being handled and sold as a separate article of manufacture, adapted for application to a wheel without the use of special tools, and capable of being substituted for a pneumatic tire upon any wheel fitted with a pneumatic tire rim of the type for which it is intended.

The rim illustrated in the drawings is a well-known standard form of pneumatic tire rim of what is commonly known as the "quick-detachable" type. I do not, however, wish to be limited to this particular rim, as my invention may be employed with numerous other types of "quick-detachable" rims, such for example as that shown in Fig. 5 of my application Serial Number 308,175, filed March 26, 1906.

Having thus described a preferred embodiment of my invention, but without desiring to limit myself specifically thereto, I claim:

1. As an article of manufacture, a detachable vehicle tire comprising a ring of resilient material forming the tire tread, metallic rings secured to the sides of said resilient ring, and rods for securing said metallic rings to said resilient ring, said rods passing transversely through the said resilient ring and fitting loosely within enlarged openings in said metallic rings, said rods being capable of movement in said enlarged openings in directions radial to said rings, the ends of said rods being provided with enlarged heads of such diameter as to be incapable of passage through said openings in said metallic rings, said metallic rings being movable toward each other along said rods, whereby said resilient ring may be compressed between said metallic rings.

2. As an article of manufacture, a detachable vehicle tire comprising a resilient ring forming the tire tread and provided with annular laterally projecting beads, metallic rings secured to the sides thereof provided with channels to receive said beads and having transverse slots passing therethrough, said slots being elongated in radial directions, and rods passing through said slots and embedded in said resilient ring, said rods being capable of movement in said elongated slots in directions radial to said rings, said rods having enlarged heads of such diameter as to be incapable of passage through said slots, said metallic rings being movable toward each other along said rods, whereby said resilient ring may be compressed between said metallic rings.

3. The combination with a vehicle wheel of a rim having at one edge thereof an outwardly projecting flange and at the other edge thereof a depressed channel, a tire mounted on said rim comprising a resilient tread member having metallic rings secured to the sides thereof, one of said rings engaging and being retained against lateral movement by said outwardly projecting flange, a locking ring adapted to be inserted in said channel when the second of said metallic rings is moved toward the ring in engagement with said flange and said resilient member compressed laterally, said locking ring limiting the lateral movement of said second ring when the same is urged laterally by the resiliency of said resilient member and being retained in said channel by said second ring when so forced laterally, the width of said tire between the outer wall of one of said metallic rings and the outer wall of the other of said metallic rings, before said tire is mounted upon the rim, being greater than the distance between the inner wall of said outwardly projecting flange and the wall of said locking ring, which engages the metallic ring of the tire, whereby when said tire is mounted in finally operative position upon the rim, the resilient tread member will be held in partially compressed condition.

4. The combination with a vehicle wheel of a rim having at one edge thereof an outwardly projecting flange and at the other edge thereof a depressed channel, a tire mounted on said rim comprising a resilient tread member having metallic rings secured to the sides thereof, rods passing transversely through said resilient member and through enlarged openings in said metallic rings, said rods being movable in said openings in directions radial to said rings, said rods having enlarged heads of such diameter as to be incapable of passage through said openings, said metallic rings being movable toward each other along said rods, whereby said resilient member may be compressed between said metallic rings, one of said rings when said tire is mounted upon said rim engaging and being retained against lateral movement by said outwardly projecting flange of said rim, and a locking ring adapted to be inserted in said channel when the second of said metallic rings is moved toward the ring in engagement with said flange and said resilient member compressed laterally, said locking ring limiting the lateral movement of said second ring when the same is urged laterally by the resiliency of said resilient member and being retained in said channel by said second ring when so forced laterally, the peripheries of said rim flange and said locking ring lying within or below the line of the heads of said rods, the width of said tire from the outer face of one of said metallic rings to the outer face of the other of said metallic rings before said tire is mounted upon said rim, and the lengths of said rods between the heads thereof, being greater than the distance from the inner side of said outwardly projecting rim flange to the portion of said locking ring which engages one of the metallic rings of said tire.

5. The combination with a vehicle wheel of a rim having at one edge thereof an outwardly projecting flange, a tire mounted on said rim comprising a resilient tread member resting upon said rim and having metallic rings secured to the sides thereof, one of said rings engaging and being retained against lateral movement by said outwardly projecting flange, said rings being provided with enlarged transverse openings therethrough, rods passing through said openings and through said resilient member and securing said rings permanently to said resilient member, said rods being capable of movement in said openings in directions radial to said rim, and a flange or locking ring detachably secured to said rim and engaging the second of said rings, the periphery of at least one of said flanges lying within or below the line of the ends of said rods.

6. In combination in a vehicle wheel, a rim, a tire mounted thereon having a laterally elastic base, rods passing through said base and capable of free longitudinal movement therethrough, annular metallic rings permanently secured in engagement with the sides of said tire by said rods, means on said rim for limiting the lateral movement of said tire in one direction, and detachable means on said rim for limiting the lateral movement of said tire in the other direction, said detachable means being normally locked to said rim by the lateral elasticity of said tire forcing the adjacent metallic ring into engagement with said detachable means on said rim.

7. As a new article of manufacture, a detachable vehicle tire comprising a resilient ring, an endless metallic ring engaging a side of said resilient ring, and transverse rods through said base and engaging said metallic ring, the connection between the rods and the rings being such as to permit free longitudinal movement of the rods through the tire base, said base being laterally elastic and held under compression by said ring and rods whereby said tire constantly urges said ring in a transverse direction away from the central portion of said base.

8. In a vehicle wheel, the combination of a tire-seating rim having a lateral extension forming a seat for a spring ring, a recess upon the inner face of said ring, annular tire-retaining flanges, one of which is adapted to seat within said recess, and means for permanently attaching said flanges to a resilient tire, said means comprising rods extending laterally through said tire and movable relatively to it, lateral compression of said tire causing one of said flanges to withdraw beyond the lateral extension of the rim and permitting the seating of the spring ring upon said rim, lateral expansion of said tire permitting said flange to seat in said recess.

9. The combination with a vehicle rim of a resilient tire, a fastening means for said rim and said tire comprising annular flanges for said tire, longitudinally movable transverse rods securing said flanges to said tire, and flange-retaining means carried by said rim, said flanges being movable toward and away from one another through compression and release of said tire, said rods having a portion projecting therefrom, said projecting portion being seated movably within said flanges.

JOHN R. GAMMETER.

Witnesses:
WALTER R. MEANS,
ROBERT W. AITKEN.